(12) United States Patent
Bailey et al.

(10) Patent No.: US 7,673,524 B2
(45) Date of Patent: *Mar. 9, 2010

(54) METHOD AND APPARATUS FOR MEASURING A PARAMETER OF A FLUID FLOWING WITHIN A PIPE HAVING A SENSING DEVICE WITH MULTIPLE SENSOR SEGMENTS

(75) Inventors: Timothy J. Bailey, Longmeadow, MA (US); Mark Fernald, Enfield, CT (US)

(73) Assignee: CiDRA Corporate Services, Inc, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/494,833

(22) Filed: Jul. 28, 2006

(65) Prior Publication Data
US 2007/0022824 A1 Feb. 1, 2007

Related U.S. Application Data

(60) Provisional application No. 60/703,940, filed on Jul. 29, 2005.

(51) Int. Cl.
*G01F 1/60* (2006.01)
(52) U.S. Cl. .................................. 73/861.17
(58) Field of Classification Search ............... 73/861.42, 73/861, 15
See application file for complete search history.

(56) References Cited

U.S. PATENT DOCUMENTS

| | | | | |
|---|---|---|---|---|
| 6,609,069 | B2* | 8/2003 | Gysling | 73/861.06 |
| 6,889,562 | B2* | 5/2005 | Gysling et al. | 73/861.42 |
| 7,032,432 | B2* | 4/2006 | Gysling et al. | 73/24.01 |
| 7,058,549 | B2* | 6/2006 | Gysling et al. | 73/861.42 |
| 2004/0016284 | A1* | 1/2004 | Gysling et al. | 73/1.16 |
| 2004/0168522 | A1* | 9/2004 | Fernald et al. | 73/861.01 |
| 2004/0226386 | A1* | 11/2004 | Gysling et al. | 73/861.42 |
| 2005/0039520 | A1* | 2/2005 | Davis et al. | 73/49.5 |
| 2005/0246111 | A1* | 11/2005 | Gysling et al. | 702/45 |
| 2007/0044572 | A1* | 3/2007 | Davis et al. | 73/861.42 |

FOREIGN PATENT DOCUMENTS

EP 0233084 8/1987

* cited by examiner

*Primary Examiner*—Harshad Patel

(57) ABSTRACT

A method and apparatus for determining at least one characteristic of a fluid flowing within a pipe is provided and includes at least one sensing device. The at least one sensing device includes a first sensor segment having a first segment polarity and being associated with a first outer portion of the pipe and a second sensor segment having a second segment polarity and being associated with a second outer portion of the pipe, wherein the first sensor segment and the second sensor segment generate sensor data responsive to the fluid flowing within the pipe. The apparatus further includes a processing device communicated with the at least one sensing device, wherein the processing device receives the sensor data and processes the sensor data to determine the at least one characteristic of the fluid.

23 Claims, 6 Drawing Sheets

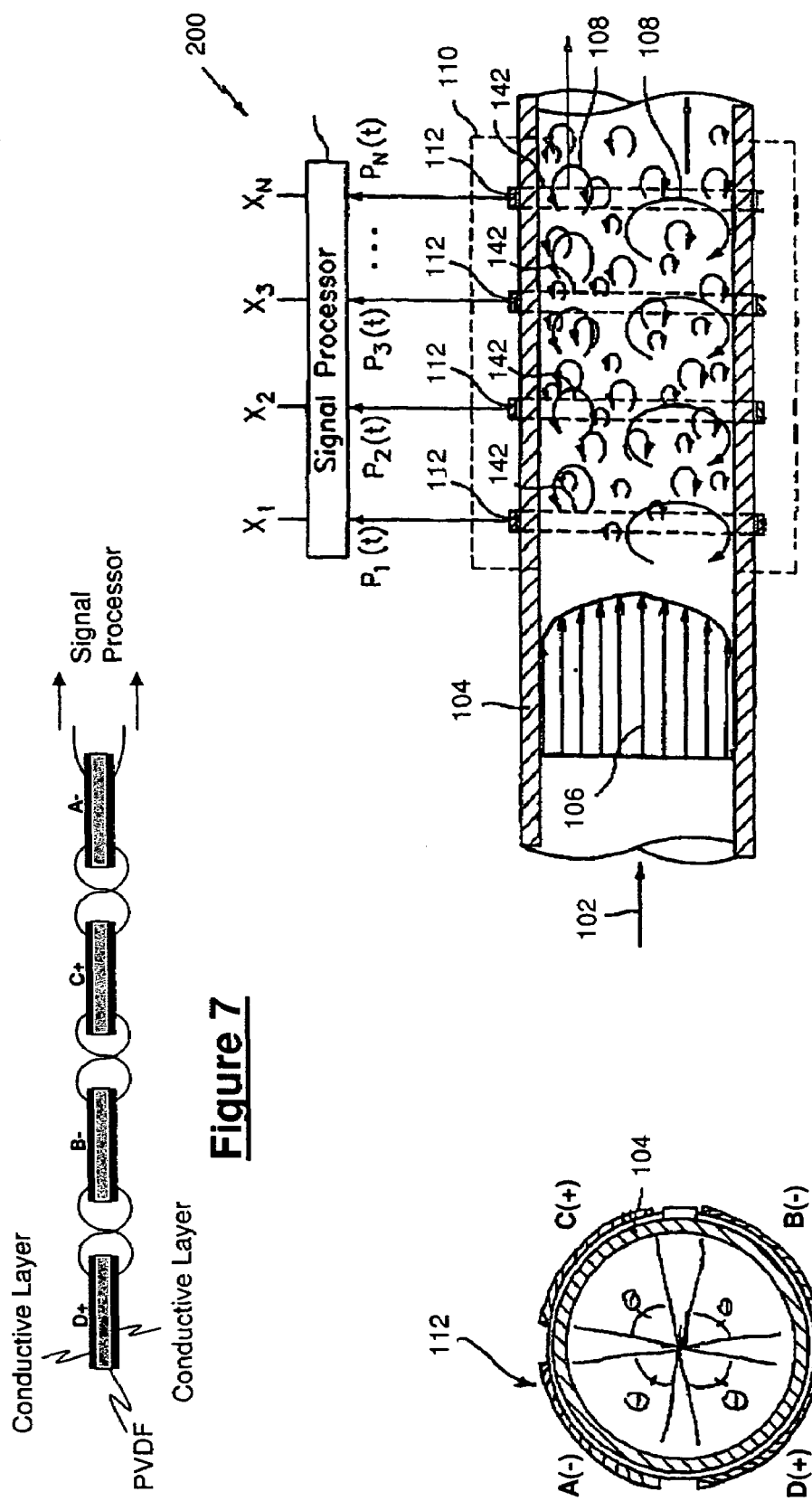

METHOD AND APPARATUS FOR MEASURING A PARAMETER OF A FLUID FLOWING WITHIN A PIPE HAVING A SENSING DEVICE WITH MULTIPLE SENSOR SEGMENTS

CROSS-REFERENCE TO RELATED PATENT APPLICATIONS

The present application claims the benefit of U.S. Provisional Patent Application No. 60/703,940, filed Jul. 29, 2005, which is incorporated by reference herein in its entirety.

TECHNICAL FIELD OF THE INVENTION

This invention relates generally to measuring a parameter of a fluid and more particularly to a method and apparatus for measuring a parameter of a fluid such as velocity and volumetric flow rate of the flow within a pipe.

BACKGROUND OF THE INVENTION

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Currently, various sensing technologies exist for measuring various physical parameters of fluids in an industrial flow process. Such physical parameters may include, for example, velocity, volumetric flow rate, composition, gas volume fraction, consistency, density, and mass flow rate. One such sensing technology is described in commonly-owned U.S. Pat. No. 6,609,069 to Gysling, entitled "Method and Apparatus for Determining the Flow Velocity Within a Pipe", which is incorporated herein by reference. The '069 patent describes a method and corresponding apparatus for measuring the flow velocity of a fluid in an elongated body (pipe) by sensing vortical disturbances convecting with the fluid. The method includes the steps of providing an array of at least two sensors disposed at predetermined locations along the elongated body, wherein each sensor samples the pressure of the fluid at the position of the sensor at a predetermined sampling rate. The sampled data from each sensor at each of a number of instants of time spanning a predetermined sampling duration is accumulated and at least a portion of a so called k-ω plot is constructed from the accumulated sampled data, wherein the k-ω plot is indicative of a dispersion relation for the propagation of acoustic pressures emanating from the vortical disturbances. A convective ridge in the k-ω plot is identified and the orientation of the convective ridge in the k-ω plot is determined. The flow velocity based on a predetermined correlation of the flow velocity with the slope of the convective ridge of the k-ω plot may then be determined from this information.

Such sensing technology is effective in determining various parameters of a fluid flow within a pipe. However, as with any computationally complex process, there remains a desire to increase computational efficiency, accuracy and robustness.

Unfortunately, in some situations flow measurements may be corrupted, degraded or they may not be able to be obtained at all due to the presence of unwanted signals masking the convective ridge (or vortical flow ridge). This unwanted energy can obscure or mask the energy of the convective ridge, and therefore, make it difficult or even impossible to isolate the energy of the convective ridge to determine the slope of the ridge. For example, the current geometry for sensors that sense vortical disturbances convecting with the fluid include sensors that provide 360° coverage of the pipe. This is undesirable for several reasons. First, the asymmetric bending modes create an equal and opposite deformation of the sensor, so no signal is created due to sensor deformation. Second, because acoustic signals (acoustic modes create a uniform distortion) and signals due to pressure pulses and pipe fluids having uniformly varying temperatures are created, the signals due to vortical disturbances may be degraded.

SUMMARY OF THE INVENTION

An apparatus for determining at least one characteristic of a fluid flowing within a pipe is provided and includes at least one sensing device. The at least one sensing device includes a first sensor segment having a first segment polarity and being associated with a first outer portion of the pipe and a second sensor segment having a second segment polarity and being associated with a second outer portion of the pipe, wherein the first sensor segment and the second sensor segment generate sensor data responsive to the fluid flowing within the pipe. The apparatus further includes a processing device communicated with the at least one sensing device, wherein the processing device receives the sensor data and processes the sensor data to determine the at least one characteristic of the fluid.

A method for determining at least one characteristic of a fluid flowing within a pipe is provided and includes receiving sensor data from at least one sensing device, wherein the at least one sensing device includes a first sensor segment and a second sensor segment disposed in the same axially plane and wherein the first sensor segment is associated with a first outer portion of the pipe and a second sensor segment is associated with a second outer portion of the pipe. The method further includes processing the sensor data to generate the at least one characteristic of the fluid flowing within the pipe.

A sensing device for determining at least one characteristic of a fluid flowing within a pipe is provided and includes a first sensor segment and a second sensor segment, wherein the first sensor segment and the sensor second segment are associated with the pipe to measure unsteady pressure associated with the fluid flow and configured to filter out at least one of acoustic mode signals and bending mode signals.

BRIEF DESCRIPTION OF THE DRAWINGS

Referring now to the drawings, the foregoing and other features and advantages of the present invention will be more fully understood from the following detailed description of illustrative embodiments, taken in conjunction with the accompanying drawings in which like elements are numbered alike:

FIG. 5 is schematic diagram of an apparatus embodying the present invention for determining at least one parameter associated with a fluid flowing in a pipe.

FIG. 6 is a cross-sectional view of a sensor of FIG. 5 disposed on the pipe.

FIG. 7 is a schematic view of the electrical connections of the segments of the sensor of FIG. 6.

DETAILED DESCRIPTION

As discussed briefly hereinabove and described in commonly-owned U.S. Pat. No. 6,609,069 to Gysling, entitled "Method and Apparatus for Determining the Flow Velocity Within a Pipe", and U.S. Pat. No. 6,889,562, each of which are incorporated herein by reference in their entireties, unsteady pressures along a pipe caused by coherent structures (e.g., turbulent eddies and vortical disturbances) that convect with a fluid flowing in the pipe contain useful information regarding parameters of the fluid. The present invention provides various means for using this information to measure parameters of a fluid flow, such as, for example, velocity and volumetric flow rate.

Referring to FIGS. 1-4, an apparatus for measuring the velocity and/or volumetric flow of a fluid flowing within a pipe is shown, wherein the apparatus is similar to that described in U.S. Pat. Nos. 6,609,069, 6,889,562, U.S. patent application Ser. No. 10/712,818, filed on Nov. 12, 2003, and U.S. patent application Ser. No. 10/712,833, U.S. Publication Number 04-0168523, filed on Nov. 12, 2003, now abandoned, which are incorporated herein by reference.

Figure 1:
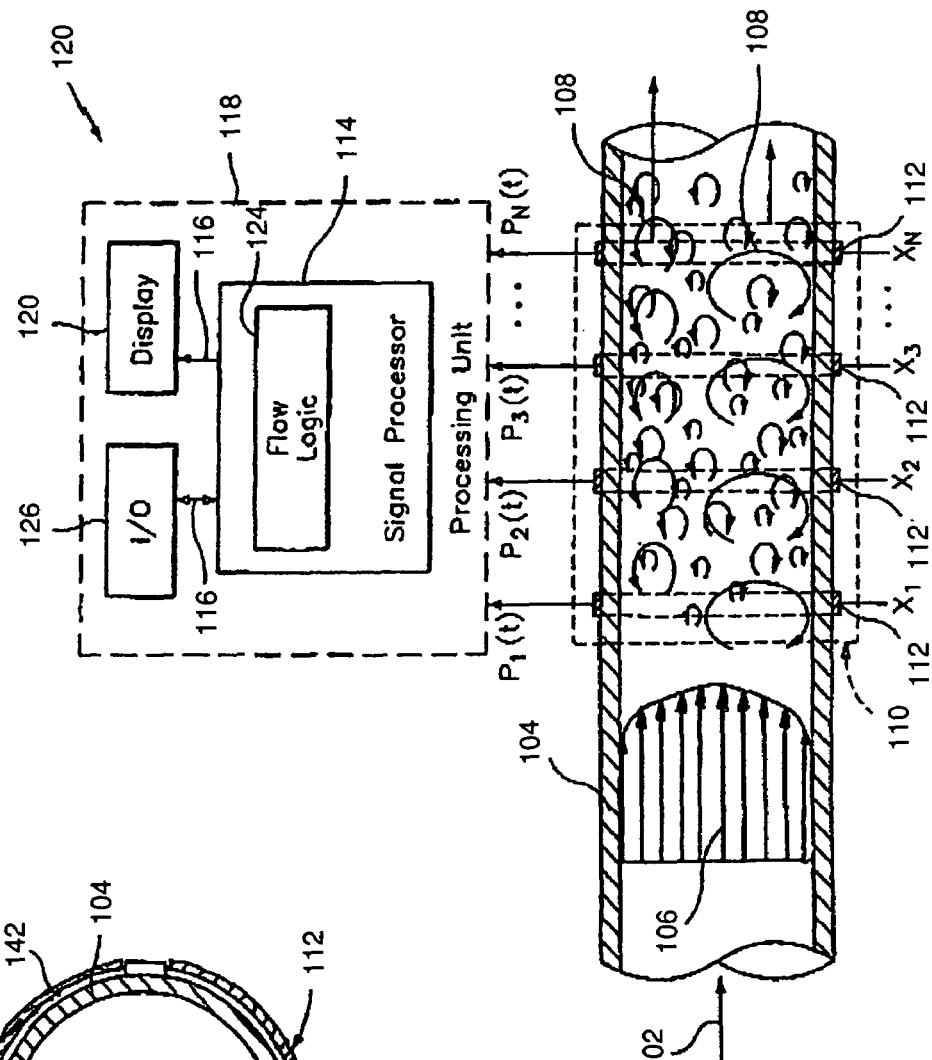
FIG. 1 is schematic diagram of an apparatus for determining at least one parameter associated with a fluid flowing in a pipe.

Referring to FIG. 1, the apparatus 100 measures at least one parameter associated with a flow 102 flowing within a duct, conduit or other form of pipe 104, wherein the parameter of the flow 102 may include, for example, at least one of the velocity of the flow 102 and the volumetric flow rate of the flow 102. The flow 102 is shown passing through the pipe 104, wherein the flow 102 is depicted as a non-stratified, Newtonian flow operating in the turbulent regime at Reynolds numbers above about 100,000. The flow 102 has a velocity profile 106 that is uniformly developed from the top of the pipe 104 to the bottom of the pipe 104. Furthermore, the coherent structures 108 in the non-stratified, turbulent, Newtonian flow 102 exhibit very little dispersion. In other words, the speed of convection of the coherent structures 108 is not strongly dependent on the physical size of the structures 108. It should be appreciated that, as used herein, dispersion describes the dependence of convection velocity with wavelength, or equivalently, with temporal frequency. It should also be appreciated that flows for which all wavelengths convect at a constant velocity are termed "non-dispersive" and for turbulent, Newtonian flow, there is typically not a significant amount of dispersion over a wide range of wavelength to diameter ratios.

While the flow 102 is depicted as having a uniform velocity profile, it should be appreciated that the present invention may be used to measure stratified flows 102. Stratified flow 102 has a velocity profile 106 that is skewed from the top of the pipe 104 to the bottom of the pipe 104, as may be found in industrial fluid flow processes involving the transportation of a high mass fraction of high density, solid materials through a pipe 104 where the larger particles travel more slowly at the bottom of the pipe 104. For example, the flow 102 may be part of a hydrotransport process.

The apparatus 100 of FIG. 1 accurately measures parameters such as velocity and volumetric flow rate of a stratified flow and/or non-stratified flow 102, wherein the apparatus 100 may include a spatial array 110 of at least two sensors 112 disposed at different axial locations $x_1 \ldots x_N$ along the pipe 104. Each of the sensors 112 provides a pressure signal P(t) indicative of unsteady pressure created by coherent structures convecting with the flow 102 within the pipe 104 at a corresponding axial location $x_1 \ldots x_N$ of the pipe 104. The pressure generated by the convective pressure disturbances (e.g., eddies 108) may be measured through strained-based sensors 112 and/or pressure sensors 112. The sensors 112 provide analog pressure time-varying signals $P_1(t), P_2(t), P_3(t) \ldots P_N(t)$ to a signal processor 114, which determines the parameter of the flow 102 using pressure signals from the sensors 112, and outputs the parameter as a signal 116.

While the apparatus 100 is shown as including four sensors 112, it is contemplated that the array 110 of sensors 112 includes two or more sensors 112, each providing a pressure signal P(t) indicative of unsteady pressure within the pipe 104 at a corresponding axial location X of the pipe 104. For example, the apparatus may include 2, 3, 4, 5, 6, 7, 8, 9, 10, 11, 12, 13, 14, 15, 16, 17, 18, 19, 20, 21, 22, 23, or 24 sensors 112. Generally, the accuracy of the measurement improves as the number of sensors 112 in the array 110 increases. Thus, the degree of accuracy provided by the greater number of sensors 112 is offset by the increase in complexity and time for computing the desired output parameter of the flow 102 and the number of sensors 112 used is dependent at least in part on the degree of accuracy desired and the desire update rate of the output parameter provided by the apparatus 100.

The signals $P_1(t) \ldots P_N(t)$ provided by the sensors 112 in the array 110 are processed by the signal processor 114, which may be part of a larger processing unit 118. For example, the signal processor 114 may be a microprocessor and the processing unit 118 may be a personal computer or other general purpose computer. It is contemplated that the signal processor 114 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

The signal processor 114 may output the one or more parameters 116 to a display 120 or another input/output (I/O) device 122. The I/O device 122 may also accept user input parameters. The I/O device 122, display 120, and signal processor 114 unit may be mounted in a common housing, which may be attached to the array 110 by a flexible cable, wireless connection, or the like. The flexible cable may also be used to provide operating power from the processing unit 118 to the array 110 if necessary.

Figure 3:
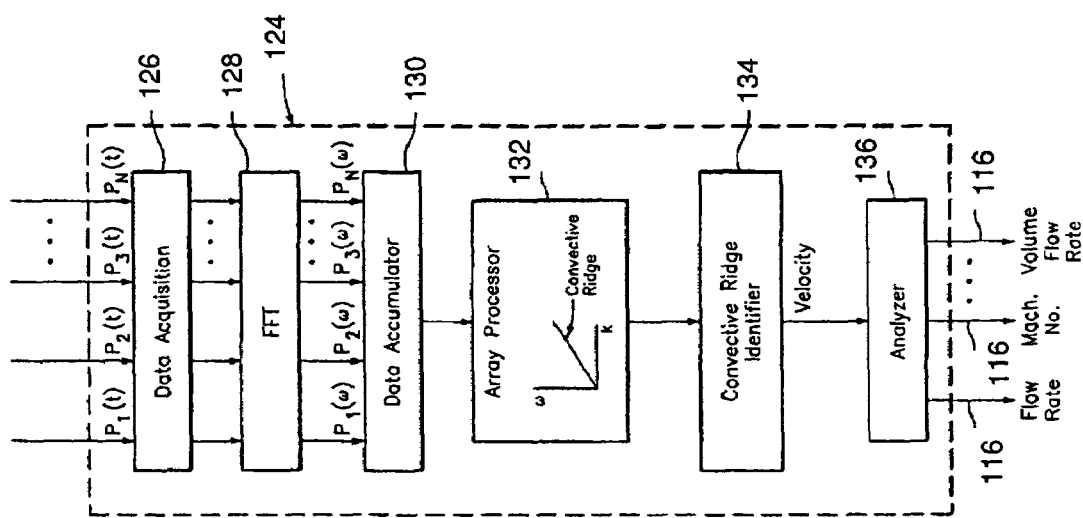
FIG. 3 is a block diagram of a flow logic used in the apparatus of the present invention.

To determine the one or more parameters 116 of the flow 102, the signal processor 114 applies the data from the sensors 112 to flow logic 124 executed by the signal processor 114. Referring to FIG. 3, an example of flow logic 124 is shown. Some or all of the functions within the flow logic 124 may be implemented in software (using a microprocessor or computer) and/or firmware, or may be implemented using analog and/or digital hardware, having sufficient memory, interfaces, and capacity to perform the functions described herein.

The flow logic 124 may include a data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

Figure 4:
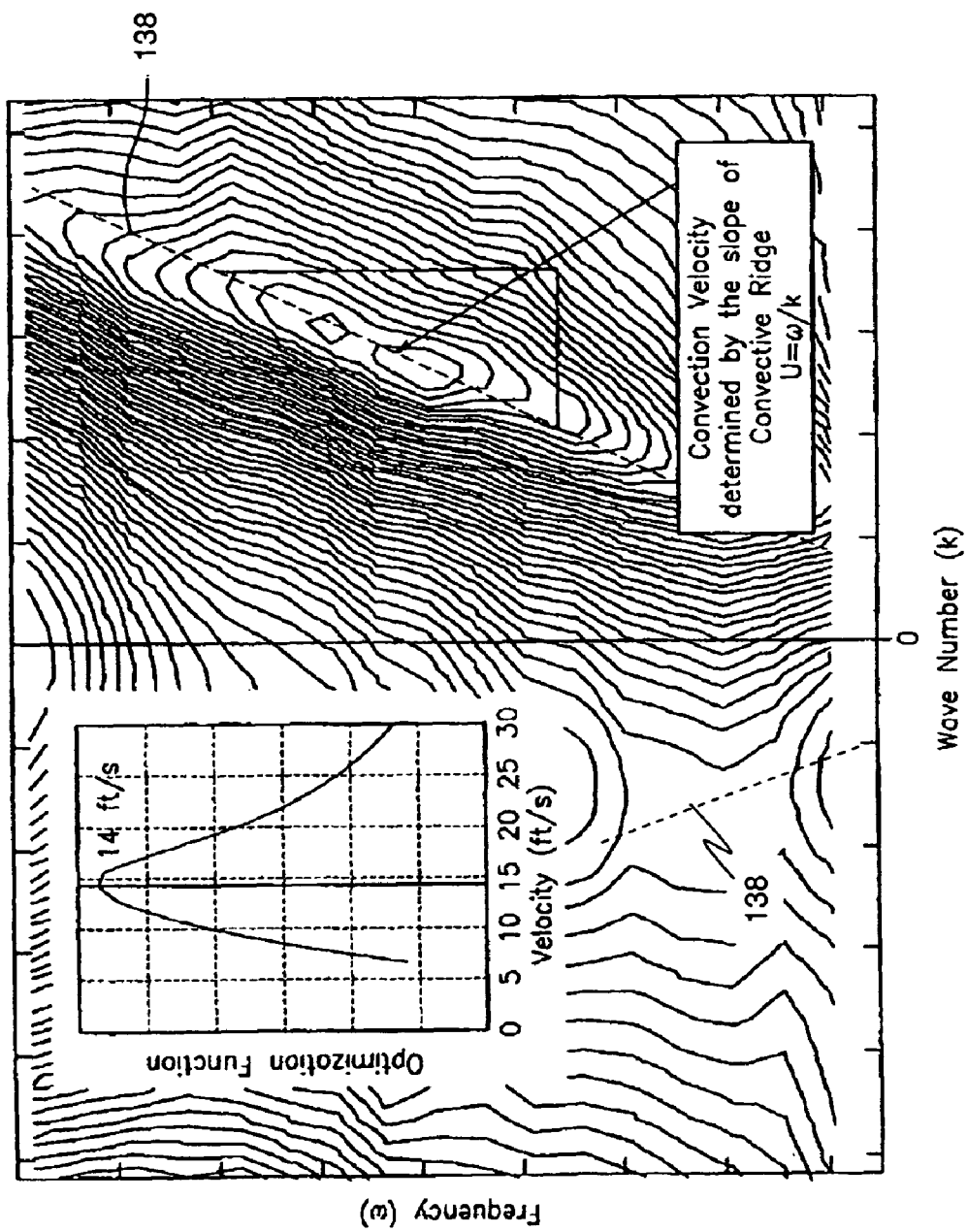
FIG. 4 is a k-ω plot of data processed from an apparatus embodying the present invention that illustrates slope of the convective ridge, and a plot of the optimization function of the convective ridge.

One technique of determining the convection velocity of the coherent structures (e.g., turbulent eddies) 108 within the flow 102 is by characterizing a convective ridge of the resulting unsteady pressures using an array of sensors or other beam forming techniques, similar to that described in U.S. patent application Ser. No. 09/729,994, filed Dec. 4, 2000, now U.S. Pat. No. 6,609,069, which is incorporated herein by reference in its entirety. A data accumulator 130 accumulates the frequency signals $P_1(\omega)-P_N(\omega)$ over a sampling interval, and provides the data to an array processor 132, which performs a spatial-temporal (two-dimensional) transform of the sensor data, from the x-t domain to the k-ω domain, and then calculates the power in the k-ω plane, as represented by a k-ω plot (FIG. 4).

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$, where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensors 112 apart from each other and yet still be within the coherence length.

Convective characteristics or parameters have a dispersion relationship that can be approximated by the straight-line equation, $$k=\omega/u,\qquad\text{(Eqn. 1)}$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. As will be described hereinafter, as the flow becomes increasingly dispersive, the convective ridge becomes increasingly non-linear. What is being sensed are not discrete events of coherent structures 108, but rather a continuum of possibly overlapping events forming a temporally stationary, essentially white process over the frequency range of interest. In other words, the convective coherent structures 108 are distributed over a range of length scales and hence temporal frequencies.

To calculate the power in the k-ω plane, as represented by a k-ω plot (see FIG. 4) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 112. It should be appreciated that the present embodiment may use temporal and spatial filtering to precondition the signals to effectively filter out the common mode characteristics Pcommon mode and other long wavelength (compared to the sensor spacing) characteristics in the pipe 104 by differencing adjacent sensors 112 and retain a substantial portion of the stochastic parameter associated with the flow field and any other short wavelength (compared to the sensor spacing) low frequency stochastic parameters.

In the case of suitable coherent structures 108 being present, the power in the k-ω plane shown in a k-ω plot of FIG. 4 shows a convective ridge 138. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 138 with some slope, the slope indicating the flow velocity.

Once the power in the k-ω plane is determined, a convective ridge identifier 134 uses one or another feature extraction method to determine the location and orientation (slope) of any convective ridge 138 present in the k-ω plane. For example, in one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information. An analyzer 136 examines the convective ridge information including the convective ridge orientation (slope) and assuming the straight-line dispersion relation given by $k=\omega/u$, the analyzer 136 determines the flow velocity and/or volumetric flow, which are output as parameters 116. The volumetric flow may be determined by multiplying the cross-sectional area of the inside of the pipe 104 with the velocity of the process flow 102.

As previously noted, for turbulent, Newtonian fluids, there is typically not a significant amount of dispersion over a wide range of wavelength to diameter ratios. As a result, the convective ridge 138 in the k-ω plot is substantially straight over a wide frequency range and, accordingly, there is a wide frequency range for which the straight-line dispersion relation given by k=ω/u provides accurate flow velocity measurements. For stratified flows, however, some degree of dispersion exists such that coherent structures 108 convect at velocities which depend on their size. As a result of increasing levels of dispersion, the convective ridge 138 in the k-ω plot becomes increasingly non- linear. Thus, unlike the non-dispersive flows, determining the flow rate of a dispersive mixture by tracking the speed at which coherent structures 108 convect requires a methodology that accounts for the presence of significant dispersion, as described in greater detail in U.S. patent application No. 11/077,709, U.S. Publication No. 05-0246111, filed on Mar. 10, 2005, now abandoned, which is incorporated herein by reference.

Figure 2:
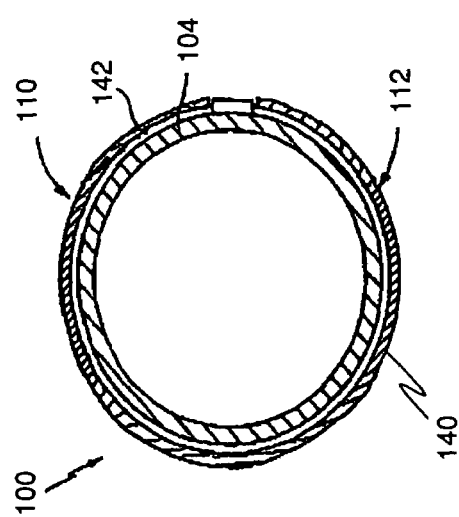
FIG. 2 is a cross-sectional view of a sensor of FIG. 1 disposed on the pipe.

In the embodiment shown in FIG. 1 and FIG. 2, each of the sensors 112 is formed by a strip of piezoelectric material 140 such as, for example, the polymer, polarized fluoropolymer, PVDF, which measures the strain induced within the pipe 104 due to the coherent structures convecting with the flow 102, similar to that described in U.S. patent application Ser. No. 10/712,818 and U.S. patent application Ser. No. 10/712,833, U.S. Publication No. 04-0168523, now abandoned, which are incorporated herein by reference. The sensors 112 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The PVDF sensors include PVDF material disposed between a pair of conductive layers (FIG. 7). The conductive layers are electrically connected to a processor by a pair of twisted wires, wherein the conductive layer may be formed of silver ink. The strips of piezoelectric film material forming the sensors 112 along each axial location $x_1 \ldots X_N$ of the pipe 104 may be adhered to the surface of a steel strap 142 (e.g., a hose clamp) that extends around and clamps onto the outer surface of the pipe 104. As discussed hereinafter, other types of sensors 112 and other methods of attaching the sensors 112 to the pipe 104 may be used.

As best shown in FIG. 2, the PVDF material 140 of each sensor 112 is disposed substantially around the circumference of the pipe 104, which enables the sensing material 140 to measure pressure disturbances attributed to the convective vortices 106 propagating with the fluid flow 102. Advantageously, the configuration of the sensing material being disposed substantially around the circumference of the pipe 104 filters out pressure disturbances associated with vibration and other bending modes of the pipe 104. Unfortunately, the sensors 112 also sense unsteady pressure attributed to acoustic pressures or noise within the pipe 104, wherein the measurement of these acoustic pressures decreases the signal to noise ratio when measuring the convective turbulence 106.

As discussed briefly hereinabove, in the geometry of the sensors 112 (in FIG. 2), asymmetric bending modes create equal and opposite deformation of the sensor 112 and therefore create no signal. Acoustic modes create a uniform distortion, and therefore create a signal along with a signal associated with vortical disturbances. (We might expect the acoustic signal to scale with the sensor length and the vortical signal to scale as the square root of the sensor length.) Additionally, pressure pulses and pipe fluids with uniform varying temperatures should also produce signals in this configuration. These signals, i.e. signals from the acoustic pressures, the pressure pulses, and the varying temperature fluids may degrade the measurement of the vortical pressure disturbance (vortical signals).

One method of filtering the acoustic noise is to difference the signals of adjacent sensors 112. While this increases the signal to noise ratio, it would be advantageous if each sensor 112 had the ability to filter both the unsteady pressures associated with the bending modes of the pipe 104 and the acoustic noise (or pressure field).

Referring to FIG. 5 and FIG. 6, an apparatus 200 in accordance with the present invention is illustrated. The apparatus 200 includes a sensor array 110 having at least one sensor 112 having a geometry such that each sensor 112 includes four segments (or sections) of PVDF (or other strain-based sensor material), wherein the segments are labeled A, B, C and D. As shown in FIG. 6, it can be seen that although segment A has the same polarity as segment B and segment C has the same polarity as segment D the segment pair AB has a different polarity than the segment pair CD. Thus, because segment pair AB has an opposite polarity than segment pair CD, the signals from this configuration are different from the configuration of FIG. 2. Moreover, in the geometry of FIG. 6, acoustic signals (and any other common mode signals, like those generated by pressure pulses or varying temperature fluids) are cancelled out.

Specifically in the embodiment shown, the sensors 112 extend over an arcuate outer surface of the pipe 104 defined by the angle θ. For example, each of the sensors 112 may extend about ¼ of the circumference of the pipe 104, wherein each pair of opposing sensors (AB and CD) measure the vortical disturbance (or other unsteady pressures that propagate with the flow). However, similar to that described with regard to FIG. 1 and FIG. 2, the opposing sensor sections (pair CD and pair AB) have the same polarity and therefore they provide a signal that filters out the asymmetric bending modes and because the opposing sections AB have an opposite polarity of the opposing sections CD, the acoustic pressure signals, temperature signals and other common mode signals are filtered out. Furthermore, referring to FIG. 7, to advantageously minimize the time to process the signals, the sensor sections (AB and CD) of each sensor 112 may be electrically connected in series to provide one signal to the processor 118. Alternatively, each pair of signals may be electrically connected together to provide two signals from each sensor 112 to the processor 118. It should be appreciated that the configuration of FIG. 6 may perform better in situations where common mode signals are limiting performance. For example in some situations we either have to reduce the gain of the sensor signals (and have poor signal to noise ratio) or keep the gain high and risk saturating the amplifiers because high acoustic levels or pressure pulses are present. It should be further appreciated that FIG. 7 illustrates only one embodiment of the electrical connections of a sensor shown in FIG. 5 and FIG. 6 and other embodiments may be used.

While the apparatus 200 is shown as including four sensors 112, it is contemplated that each array 110 may include two or more sensors 112, with each sensor 112 providing a pressure signal P(t) indicative of unsteady pressure within the pipe 104 at a corresponding axial location X of the pipe 104. For example, the apparatus may include 2, 3, 4, 5, 6, 7, 8, 9, 10, 11, 12, 13, 14, 15, 16, 17, 18, 19, 20, 21, 22, 23, or 24 sensors 112. Generally, the accuracy of the measurement improves as the number of sensors 112 in the array increases. The degree of accuracy provided by the greater number of sensors 112 is offset by the increase in complexity and time for computing the desired output parameter of the flow 102. Therefore, the number of sensors 112 used is dependent at least on the degree of accuracy desired and the desire update rate of the output parameter provided by the apparatus 200.

It should be appreciated that while the embodiment of FIGS. 5-7 of the present invention illustrate a sensor 112 having four segments, the invention contemplates a sensor having any number of sensor segments (for example, segments A-L) wherein the sensors may be of any length provided the following relationships are met. For sensor configurations that filter the acoustic signals, temperature signals and other common mode signals, the relationship may be given by, $$\int_0^{2\pi} \varepsilon(\theta)d\theta = 0, \tag{Eqn. 2}$$

wherein $\varepsilon(\theta)$ is equal to the signal power (e.g. area, length). In other words the sum of all the signals provided by the sensors 112 around the circumference of the pipe 104 should equal zero. Basically, the negative polarity sensor segments must be equal in length or area around the pipe circumference as the positive polarity sensor segments. For sensor configurations that filter the bending mode signals, the relationship may be given by:

$$\int_{\pi+0}^{\theta+\pi} \varepsilon(\theta)d\theta = \int_{\theta+\pi}^{\theta+2\pi} \varepsilon(\theta)d\theta, \tag{Eqn. 3}$$

wherein $\varepsilon(\theta)$ is equal to the signal power (e.g. area, length). In other words, at any given angle or $\theta$, the sensor sections length or area on one half the pipe 104 is equal to the sensor sections length or area on the opposing other half of the pipe 104.

For example, as given by Equation 2 hereinbefore, to create a sensor 112 that filters out the acoustic signals, the sensor is configured such that the sum of the signals generated by the sensor 112 around the circumference of the pipe 104 should equal zero. This may be accomplished by arranging the sensor(s) 112 such that the negative polarity sensor segments are equal in length or area around the circumference of the pipe 104 to the positive polarity sensor segments. In a similar fashion and as given by Equation 3, to create a sensor 112 that filters out the bending mode signals, the sensor segments have the same polarity and is configured such that, at any given angle or $\theta$, the surface area of the sensor segments or the length of the sensor segments on one side of the pipe is substantially equal to the surface area of the sensor segments or the length of the sensor segments on the opposing side of the pipe.

Figure 8:
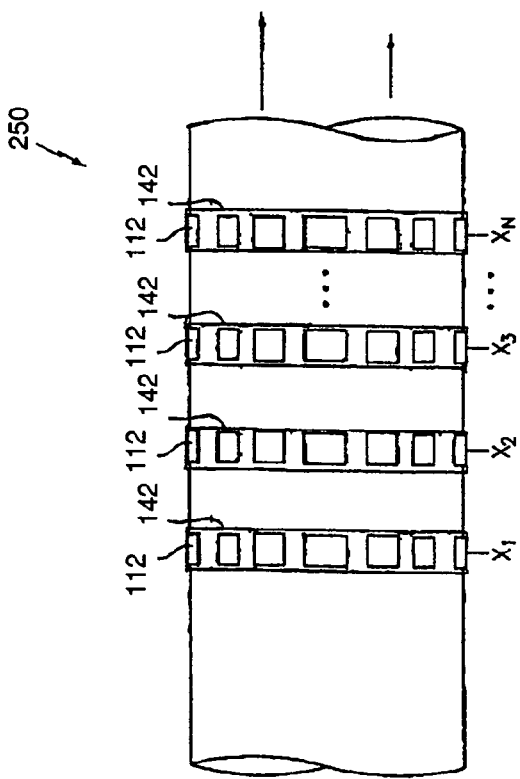
FIG. 8 is schematic diagram of an embodiment of an apparatus embodying the present invention for determining at least one parameter associated with a fluid flowing in a pipe.
Figure 9:
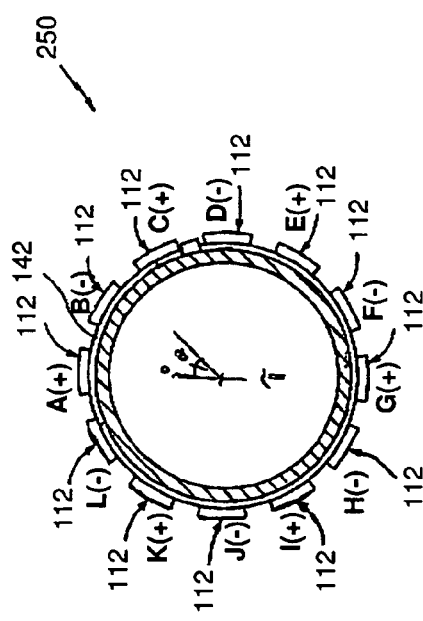
FIG. 9 is a cross-sectional view of a sensor of FIG. 8 disposed on the pipe.

Accordingly, to create a sensor 112 that filters out both of the acoustic signals and the bending mode signals, the sensor 112 should be configured to satisfy both of the aforementioned conditions, i.e. Equations 2 and 3. Two such configurations can be seen by referring to FIG. 6 and FIG. 8 and FIG. 9 which filter out both the bending mode signals and the acoustic signals. As shown in FIG. 8 and FIG. 9, the sensor 250 includes a plurality of segments 112 (in this case twelve) disposed around the outer surface of the pipe 104, wherein six of the segments A(+), C(+), E(+), G(+), I(+), K(+) have a positive polarity and six of the segments B(−), D(−), F(−), H(−), J(−), L(−) have a negative polarity and wherein the segments are arranged such that no two segments having the same polarity are disposed adjacent each other. It should be appreciated that while the sensors in FIG. 8 and FIG. 9 are shown as alternating in polarity, it is not necessary to satisfy the conditions of Equations 2 and 3.

Thus, in a similar fashion to FIG. 6, the configuration in FIG. 8 and FIG. 9 filters out the bending mode signals because the sensor segments 112 are associated with the pipe 104 such that, at any given angle or $\theta$, the polarity of the opposing sensors are the same and the aggregate length of the sensor segments 112 and/or the aggregate area of the sensor segments 112 on one half of the pipe 104 is equal to the aggregate length of the sensor segments 112 and/or the aggregate area of the sensor segments 112 on the other half of the pipe 104. Additionally, the acoustic signals are filtered out because the sum of the signals from the sensor segments 250 of one polarity and the signals from the sensor segments 250 of the opposite polarity are essentially equal to zero.

On the other hand, while one of the preferred embodiments may include sensor segments to filter both acoustic signals (or temperature or other common mode signals) and bending mode signals, the present invention also contemplates segmented sensors 112 that filter only acoustic signals or only bending mode signals. For example, the sensor 112 in FIG. 2 is configured to filter only the bending mode signals. This is because the sensor 112 in FIG. 2 is associated with the pipe 104 such that, at any given angle or $\theta$, the polarity of the sensors are the same and the length of the sensor 112 and/or the area of the sensor 112 on one half of the pipe 104 is equal to the length of the sensor 112 and/or the area of the sensor 112 on the other half of the pipe 104.

Figure 10:
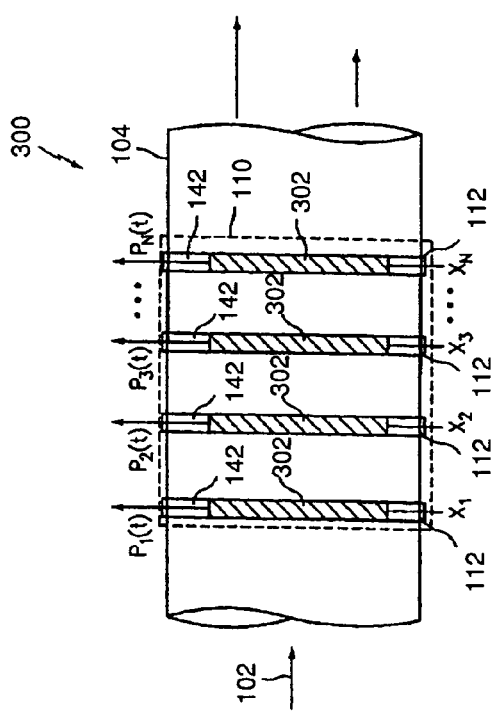
FIG. 10 is schematic diagram of an embodiment of an apparatus embodying the present invention for determining at least one parameter associated with a fluid flowing in a pipe.
Figure 11:
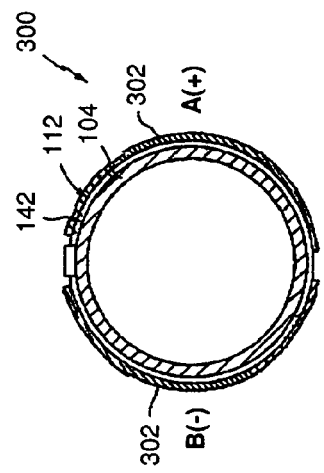
FIG. 11 is a cross-sectional view of a sensor of FIG. 10 disposed on the pipe.

Alternatively, the embodiment 300 as shown in FIG. 10 and FIG. 11 is configured to primarily filter out the acoustic modes as opposed to the bending modes. This is because the sensor segments 302 are of opposite polarity and are associated with the pipe 104 such that the sum of all the signals provided by the sensor segments 302 around the circumference of the pipe 104 are essentially equal to zero. As shown in FIG. 10 and FIG. 11, the embodiment 300 is shown wherein the segments 302 of the sensor 112 may have opposite polarities and the same length or area to filter the acoustic signals, temperature signals and other common mode signals. This configuration may be sufficient for applications wherein the vibration or bend of the pipe 104 is minimal and while the segments are shown opposing each other, the present invention contemplates that the segments do not have to be opposite of each other and may be disposed in any configuration suitable to the desired end purpose. For example, the configuration of the segments of the bands may be disposed anywhere along the circumference of the pipe 104 provided the relationship described hereinbefore is met.

Similarly, the segments of the sensor 112 may be of the same polarity and disposed opposing each other and may have the same length or area to filter out the bending mode signals. This configuration may be sufficient wherein acoustic noise, temperature variations, or other common mode signals are minimal. As above, the segments may be disposed in any configuration suitable to the desired end purpose and thus may be disposed in any manner provided the relationship described hereinbefore is met.

It should be appreciated that any configuration satisfying Equation 2 and Equation 3 may be used, suitable to the desired end purpose. For example, referring again to FIG. 6, the sensors 112 described hereinabove may be arranged to primarily filter out the bending mode signals or primarily filter out the acoustic signals. As can be seen, if the sensor segments in FIG. 6 were configured to be of the same polarity, then sensor segments of FIG. 6 would only filter out the bending mode signals. Alternatively, if the sensor segments were configured such that sensor segment B were of a positive polarity (i.e. B(+)) and sensor segment D were of a negative polarity (i.e. D(−)), then the sensor segments would only filter out the acoustic signals, and would function similar to the embodiment shown in FIG. 11.

Additionally, the sensor segments may be arranged to measure signals responsive to a desired portion of the flow 102 within the pipe 104. It should be appreciated that for situations where a measurement of a portion of the flow is desired, such as where a stratified flow is present, the sensor segments can be arranged to measure the signals in a desired portion of the pipe 104 to obtain a desired flow rate measurement. For example, when a stratified flow is present is may be desirable to obtain a flow rate measurement for the middle portion of the pipe (i.e. nominal flow rate measurement). As such, the sensors may be configured in a plurality of configurations. For example, referring to FIG. 10, in the case of a stratified flow mentioned hereinbefore, the sensors may be disposed around only the middle portion of the pipe. Alternatively, similar results may be obtained by disposing the sensor segments in FIG. 9 to be disposed in the area of the middle portion of the pipe 104. For example, sensor segments D and J, and/or C and I and/or K and E may be used, wherein the sensor segment pairs are of opposite polarity. Alternative, sensors D and J may be used. One will appreciate that the circumferential length of the sensors will determine the portion of the flow that will be measured, similar to that described in U.S. patent application 11/077,709, U.S. Publication No. 05-0246111, filed on Mar. 10, 2005, now abandoned, which is incorporated herein by reference.

It should be appreciated that in any of the embodiments described herein, the sensors 112 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor 112 and the pipe 104. The sensors 112 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 104. If desired, for certain applications, gratings may be detached from (or strain or acoustically isolated from) the pipe 104 if desired. It is also contemplated that any other strain sensing technique may be used to measure the variations in strain in the pipe 104, such as highly sensitive piezoelectric, electronic or electric, strain gages attached to or embedded in the pipe 104.

It should be further appreciated that in various embodiments of the present invention, a piezo-electronic pressure transducer may be used as one or more of the pressure sensors and it may measure the unsteady (or dynamic or ac) pressure variations inside the pipe 104 by measuring the pressure levels inside the pipe 104. For example, in one embodiment of the present invention, the sensors 112 may comprise pressure sensors manufactured by PCB Piezotronics of Depew, N.Y. and/or may include integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The sensors 112 may incorporate a built-in MOSFET microelectronic amplifier to convert the high-impedance charge output into a low-impedance voltage signal. The sensors 112 may be powered from a constant-current source and can operate over long coaxial or ribbon cable without signal degradation. It should be appreciated that the low-impedance voltage signal is not affected by triboelectric cable noise or insulation resistance-degrading contaminants and power to operate integrated circuit piezoelectric sensors generally takes the form of a low-cost, 24 to 27 VDC, 2 to 20 mA constant-current supply. Most piezoelectric pressure sensors are constructed with either compression mode quartz crystals preloaded in a rigid housing, or unconstrained tourmaline crystals. These designs advantageously give the sensors microsecond response times and resonant frequencies in the hundreds of kHz, with minimal overshoot or ringing, wherein small diaphragm diameters ensure spatial resolution of narrow shock waves.

Additionally, the output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore it is contemplated that each of the sensors 112 may include a piezoelectric sensor that provides a piezoelectric material to measure the unsteady pressures of the flow 102. The piezoelectric material, such as the polymer, polarized fluoropolymer, PVDF, measures the strain induced within the process pipe 104 due to unsteady pressure variations within the flow 102. Strain within the pipe 104 is transduced to an output voltage or current by the attached piezoelectric sensors 112. The PVDF material forming each piezoelectric sensor 112 may be adhered to the outer surface of a steel strap that extends around and clamps onto the outer surface of the pipe 112. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique include non-intrusive flow rate measurements, low cost, a measurement technique requires no excitation source (i.e. ambient flow noise is used as a source), flexible piezoelectric sensors can be mounted in a variety of configurations to enhance signal detection schemes (these configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals) and higher temperatures (140 C) (co-polymers).

It should be appreciated that the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. An apparatus for determining at least one characteristic of a fluid flowing within a pipe, the apparatus comprising:
   at least one sensing device, wherein said at least one sensing device includes a first sensor segment having a first segment polarity and being associated with a first outer portion of the pipe and a second sensor segment having a second segment polarity and being associated with a second outer portion of the pipe, wherein said first sensor segment and said second sensor segment generate sensor data responsive to the fluid flowing within the pipe; and
   a processing device communicated with said at least one sensing device, wherein said processing device receives said sensor data and processes said sensor data to determine the at least one characteristic of the fluid,
   wherein said at least one sensing device includes a plurality of sensor segments each of which include a sensor segment length, wherein when said at least one sensing device is configured to filter out acoustic signals, temperature signals and common mode signals, said sensor segment length is sized such that the relationship between said acoustic signals, said temperature signals and said common mode signals is given by $$\int_0^{2\pi} \varepsilon(\theta)d\theta = 0,$$

wherein $\varepsilon(\theta)$ is equal to the signal power.

2. The apparatus of claim 1, wherein said first sensor segment and said second sensor segment form a sensor segment pair, said first sensor segment associated with said first outer portion of the pipe is disposed oppositely said second sensor segment associated with said second outer portion of the pipe, and either said first segment polarity is opposite said second segment polarity to filter acoustic signals, temperature signals, other common mode signals, or some combination thereof, or alternatively said first segment polarity is the same polarity as said second segment polarity to filter out bending mode signals.

3. The apparatus of claim 1, wherein said at least one sensing device further includes a third sensor segment having a third segment polarity and being associated with a third outer portion of the pipe and a fourth sensor segment having a fourth segment polarity and being associated with a fourth outer portion of the pipe, so as to form two sensor segment pairs having one segment pair with first and second sensor segments and another segment pair with third and fourth sensor segments.

4. The apparatus of claim 3, wherein said first sensor segment associated with said first outer portion of the pipe is disposed oppositely said second sensor segment associated with said second outer portion of the pipe, and wherein said third sensor segment associated with said third outer portion of the pipe is disposed oppositely said forth sensor segment associated with said fourth outer portion of the pipe.

5. The apparatus of claim 4, wherein said first segment polarity has the same polarity as to said second segment polarity and wherein said third segment polarity has the same polarity as to said fourth segment polarity.

6. The apparatus of claim 3, wherein said two sensor segment pairs are electrically connected in series to provide one signal to said processor device, including where said first sensor segment is connected with said processor, where said first sensor segment is also connected in series with said third sensor segment, where said third sensor segment is connected in series with said second sensor segment and said second sensor segment is connected in series with said fourth sensor segment.

7. The apparatus of claim 3, wherein the two sensor segment pairs have an opposite polarity from each other.

8. The apparatus of claim 1, wherein the at least one characteristic is at least one of the velocity and the volumetric flow rate of the fluid.

9. The apparatus of claim 1, wherein said at least one sensing device includes a plurality of sensing devices axially associated with the pipe to form a sensor array.

10. The apparatus for determining at least one characteristic of a fluid flowing within a pipe, the apparatus comprising:
    at least one sensing device, wherein said at least one sensing device includes a first sensor segment having a first segment polarity and being associated with a first outer portion of the pipe and a second sensor segment having a second segment polarity and being associated with a second outer portion of the pipe, wherein said first sensor segment and said second sensor segment generate sensor data responsive to the fluid flowing within the pipe; and
    a processing device communicated with said at least one sensing device, wherein said processing device receives said sensor data and processes said sensor data to determine the at least one characteristic of the fluid, wherein said at least one sensing device includes a plurality of sensor segments each of which include a sensor segment length, wherein when said at least one sensing device is configured to filter out bending mode signals, said sensor segment length is sized such that the bending mode signals are given by $$\int_{\pi+0}^{\theta+\pi} \varepsilon(\theta)d\theta = \int_{\theta+\pi}^{\theta+2\pi} \varepsilon(\theta)d\theta,$$

wherein $\varepsilon(\theta)$ is equal to the signal power.

11. The apparatus of claim 10, wherein said at least one sensing device includes a plurality of sensor segments each of which include a sensor segment length, wherein when said at least one sensing device is configured to filter out acoustic signals, temperature signals and common mode signals, said sensor segment length is sized such that the relationship between said acoustic signals, said temperature signals and said common mode signals is given by $$\int_0^{2\pi} \varepsilon(\theta)d\theta = 0,$$

wherein $\epsilon(\theta)$ is equal to the signal power.

12. A method for determining at least one characteristic of a fluid flowing within a pipe, the method comprising:
receiving sensor data from at least one sensing device, wherein said at least one sensing device includes a first sensor segment and a second sensor segment disposed in the same axial plane, said first sensor segment being associated with a first outer portion of the pipe and a second sensor segment associated with a second outer portion of the pipe; and
processing said sensor data to generate the at least one characteristic of the fluid flowing within the pipe,
wherein the method comprises configuring said at least one sensing device as a plurality of sensor segments, each of which includes a sensor segment length, wherein when said at least one sensing device is configured to filter out acoustic signals, temperature signals and common mode signals, said sensor segment length is sized such that the relationship between said acoustic signals, said temperature signals and said common mode signals is given by $$\int_0^{2\pi} \varepsilon(\theta)d\theta = 0,$$

wherein $\epsilon(\theta)$ is equal to the signal power.

13. The method of claim 12, wherein the method comprises configuring said at least one sensing device as a plurality of sensor segments associated with an outer portion of the pipe in the same axial plane.

14. The method of claim 12, further comprising disposing a third sensor segment and a fourth sensor segment in said same axial plane as said first sensor segment and said second sensor segment; including connecting in series said first sensor segment to said third sensor segment; connecting in series said third sensor segment to said second sensor segment; and connecting in series said second sensor segment to said fourth sensor segment.

15. The method of claim 14, wherein the method comprises configuring said first sensor segment and said second sensor segment with a first polarity; configuring said third sensor segment and said fourth sensor segment with a second polarity; and configuring said first polarity to be opposite to said second polarity.

16. The method of claim 12, wherein the method comprises configuring said first sensor segment with a first polarity; configuring said second sensor segment with a second polarity; and configuring said first polarity to be opposite to said second polarity.

17. The method of claim 12, wherein said processing comprises processing said sensor data to determine at least one of the velocity and the volumetric flow rate of the fluid.

18. The method of claim 12, wherein the method comprises configuring said at least one sensing device as a plurality of sensing devices axially associated with the pipe so as to form a sensor array.

19. The method for determining at least one characteristic of a fluid flowing within a pipe, the method comprising;
receiving sensor data from at least one sensing device, wherein said at least one sensing device includes a first sensor segment and a second sensor segment disposed in the same axial plane, said first sensor segment being associated with a first outer portion of the pipe and a second sensor segment associated with a second outer portion of the pipe, and
processing said sensor data to generate the at least one characteristic of the fluid flowing within the pipe,
wherein the method comprises configuring said at least one sensing device as a plurality of sensor segments, each of which includes a sensor segment length, wherein when said at least one sensing device is configured to filter out bending mode signals, said sensor segment length is sized such that the bending mode signals are given by $$\int_{\pi+0}^{\theta+\pi} \varepsilon(\theta)d\theta = \int_{\theta+\pi}^{\theta+2\pi} \varepsilon(\theta)d\theta,$$

wherein $\epsilon(\theta)$ is equal to the signal power.

20. The method of claim 19, wherein the method comprises configuring said at least one sensing device as a plurality of sensor segments, each of which includes a sensor segment length, wherein when said at least one sensing device is configured to filter out acoustic signals, temperature signals and common mode signals, said sensor segment length is sized such that the relationship between said acoustic signals, said temperature signals and said common mode signals is given by $$\int_0^{2\pi} \varepsilon(\theta)d\theta = 0,$$

wherein $\epsilon(\theta)$ is equal to the signal power.

21. A sensing device for determining at least one characteristic of a fluid flowing within a pipe, the sensing device comprising:
a first sensor segment, and
a second sensor segment, wherein said first sensor segment and said sensor second segment are associated with the pipe to measure unsteady pressure associated with the fluid flow and configured to filter out at least one of acoustic mode signals and bending mode signals,
wherein said first sensor segment and said second sensor segment are configured to satisfy at least one of a first equation and a second equation, wherein said first equation describes the relationship between acoustic signals, temperature signals and common mode signals as being given by $$\int_0^{2\pi} \varepsilon(\theta)d\theta = 0,$$

and wherein said second equation describes the bending mode signals as being given by $$\int_{\pi+0}^{\theta+\pi} \varepsilon(\theta)d\theta = \int_{\theta+\pi}^{\theta+2\pi} \varepsilon(\theta)d\theta,$$

wherein $\epsilon(\theta)$ is equal to the signal power.

22. The sensing device of claim 21, wherein said first sensor segment includes at least one of a first sensor segment area and a first sensor segment length and wherein said second sensor segment includes at least one of a second sensor segment area and a second sensor segment length, wherein at least one of said first sensor segment area is equal to said second sensor segment area and said first sensor segment length is equal to said second sensor segment length.

23. The sensing device of claim 21, wherein said first sensor segment includes a first sensor segment polarity and said second sensor segment includes a second sensor segment polarity, said first sensor portion polarity being opposite said second sensor portion polarity.

* * * * *